United States Patent
Kramer et al.

(10) Patent No.: US 7,861,291 B2
(45) Date of Patent: Dec. 28, 2010

(54) SYSTEM AND METHOD FOR IMPLEMENTING ACLS USING STANDARD LPM ENGINE

(75) Inventors: David B. Kramer, Cedar Park, TX (US); Chris P. Thron, Austin, TX (US); Bernard Karl Gunther, Modbury Heights (AU)

(73) Assignee: Freescale Semiconductor, Inc., Austin, TX (US)

( * ) Notice: Subject to any disclaimer, the term of this patent is extended or adjusted under 35 U.S.C. 154(b) by 1244 days.

(21) Appl. No.: 11/422,063

(22) Filed: Jun. 2, 2006

(65) Prior Publication Data

US 2007/0283144 A1    Dec. 6, 2007

(51) Int. Cl.
*G06F 17/00* (2006.01)
(52) U.S. Cl. ........................................ 726/13; 713/154
(58) Field of Classification Search ................. 713/150, 713/151, 153, 154, 160, 161, 168; 707/1, 707/100, 3, 102, 103, 6, 7, 705, 706, 758, 707/785; 709/212, 238, 239, 240, 242, 241; 370/255, 238, 401, 389, 392, 395.3; 711/108, 711/206; 726/1, 11–14
See application file for complete search history.

(56) References Cited

U.S. PATENT DOCUMENTS

| | | | |
|---|---|---|---|
| 6,237,061 B1 * | 5/2001 | Srinivasan et al. ........... 711/108 |
| 6,600,744 B1 * | 7/2003 | Carr et al. .................... 370/392 |
| 6,675,223 B1 * | 1/2004 | Corl et al. .................... 709/238 |
| 6,715,029 B1 * | 3/2004 | Trainin et al. ................ 711/108 |
| 6,947,931 B1 * | 9/2005 | Bass et al. ...................... 707/6 |
| 7,080,195 B2 * | 7/2006 | Ngai et al. ................... 711/108 |
| 7,251,651 B2 * | 7/2007 | Lunteren ......................... 707/4 |
| 7,325,059 B2 * | 1/2008 | Barach et al. ............... 709/225 |
| 7,415,463 B2 * | 8/2008 | Testa .............................. 707/6 |
| 7,539,153 B1 * | 5/2009 | Liang et al. .................. 370/255 |
| 2002/0191605 A1 * | 12/2002 | Lunteren et al. ............ 370/389 |
| 2003/0067874 A1 * | 4/2003 | See et al. .................. 370/230.1 |
| 2004/0030802 A1 * | 2/2004 | Eatherton et al. ........... 709/245 |
| 2004/0254909 A1 | 12/2004 | Testa .............................. 707/1 |
| 2005/0076138 A1 | 4/2005 | Sterne ......................... 709/238 |
| 2005/0114602 A1 | 5/2005 | Ngai et al. ................... 711/128 |
| 2005/0114657 A1 | 5/2005 | Kumar et al. ............... 713/164 |

* cited by examiner

*Primary Examiner*—Nirav Patel
(74) *Attorney, Agent, or Firm*—VanLeeuwen & VanLeeuwen; Joanna G. Chiu

(57) ABSTRACT

A method, data processing system, and computer program product are provided for retrieving access rules using a plurality of subtables. An incoming packet that includes fields of data is received from a network. A key is formed from the fields, the key includes a number of subkeys. The subkeys are selected and each of the selected subkeys is used to search a different subtable. If a subtable entry is a pointer, a next level subtable is searched until a failure or data is encountered. If a failure occurs, a default rule is applied. If data is encountered, the key is masked using a stored mask value. The resulting masked key is compared to a stored rule. If they match, the identified rule is applied, otherwise the default rule is applied.

17 Claims, 14 Drawing Sheets

After Further Expansion to Accommodate Rule 2
731

| Addr | | | | | | | Value |
|---|---|---|---|---|---|---|---|
| A1+2561: | PTR | B1 | 0 | 0 | 0 | 0 | 10.1 |

| Addr | etype | base | entropy | stride | count | alt | Value |
|---|---|---|---|---|---|---|---|
| B1: | DATA | A2 | 0 | 8 | 1 | 0 | 0 |
| B1+1: | PTR | C1 | 0 | 8 | 0 | 0 | 1 |
| B1+2: | DATA | A2 | 0 | 8 | 0 | 0 | 2 |
| ⋮ | ⋮ | ⋮ | ⋮ | ⋮ | ⋮ | ⋮ | ⋮ |
| B1+$2^8$: | DATA | A2 | 0 | 8 | 0 | 0 | 255 |

| Addr | etype | base | entropy | stride | count | alt | Value |
|---|---|---|---|---|---|---|---|
| C1: | DATA | A2 | 0 | 8 | 1 | 0 | 0 |
| C1+1: | DATA | A2 | 0 | 8 | 0 | 0 | 1 |
| ⋮ | ⋮ | ⋮ | ⋮ | ⋮ | ⋮ | ⋮ | ⋮ |
| C1+$2^8$: | DATA | A2 | 0 | 8 | 0 | 0 | 255 |

| | Key Bits | Mask Field | Count | L1 Alt | L2 Alt | Rule # |
|---|---|---|---|---|---|---|
| A2: | 10.1.1.1.0.0.0.0.6.21.128.0 | 255.255.255.255.0.0.0.0.255.255.128.0 | 511 | B1 | C1 | 3 |

FIG. 10

After Expansion Leads to LPM Table for Rules 2 & 3
811

| Addr | etype | base | count | alt | Value |
|---|---|---|---|---|---|
| A1: | FAIL | - | 0 | 0 | 0.0 |
| ↓ | ↓ | ↓ | ↓ | ↓ | |
| A1+2561: | PTR | B1 | 0 | 0 | 10.1 |
| A1+2562: | FAIL | - | 0 | 0 | |
| A1+$2^{16}$: | ↓ | ↓ | ↓ | ↓ | 255.255 |

| Addr | etype | base | count | alt |
|---|---|---|---|---|
| B1: | DATA | A2 | 1 | 0 |
| B1+1: | PTR | C1 | 0 | 0 |
| B1+2: | DATA | A2 | 0 | 0 |
| ↓ | ↓ | ↓ | ↓ | ↓ |
| B1+$2^8$: | DATA | A2 | 0 | 0 |

| Addr | etype | base | count | alt |
|---|---|---|---|---|
| C1: | PTR | D1 | 1 | 0 |
| C1+1: | PTR | D1 | 0 | 0 |
| ↓ | ↓ | ↓ | ↓ | ↓ |
| C1+$2^8$: | PTR | D1 | 0 | 0 |

| Addr | etype | base | count | alt |
|---|---|---|---|---|
| D1: | DATA | A2 | 256 | 0 |
| D1+1: | DATA | A2 | 0 | 0 |
| ↓ | ↓ | ↓ | ↓ | ↓ |
| D1+172: | PTR | D2 | 0 | 0 |
| D1+173: | DATA | A2 | 0 | 0 |
| ↓ | ↓ | ↓ | ↓ | ↓ |
| D1+$2^8$: | DATA | A2 | 0 | 0 |

| Addr | etype | base | count | alt |
|---|---|---|---|---|
| D2: | PTR | D3 | 1 | 0 |
| D2+1: | PTR | D3 | 0 | 0 |
| ↓ | ↓ | ↓ | ↓ | ↓ |
| D2+$2^8$: | PTR | D3 | 0 | 0 |

| Addr | etype | base | count | alt |
|---|---|---|---|---|
| D3: | PTR | D4 | 255 | 0 |
| D3+1: | PTR | D4 | 0 | 0 |
| ↓ | ↓ | ↓ | ↓ | ↓ |
| D3+$2^8$: | PTR | D4 | 0 | 0 |

| Addr | etype | base | count | alt |
|---|---|---|---|---|
| D4: | PTR | D5 | 255 | 0 |
| D4+1: | PTR | D5 | 0 | 0 |
| ↓ | ↓ | ↓ | ↓ | ↓ |
| D4+$2^8$: | PTR | D5 | 0 | 0 |

| Addr | etype | base | count | alt |
|---|---|---|---|---|
| D5: | DATA | A2 | 255 | 0 |
| D5+1: | DATA | A2 | 0 | 0 |
| ↓ | ↓ | ↓ | ↓ | ↓ |
| D5+6: | PTR | D6 | 0 | 0 |
| D5+7: | DATA | A2 | 0 | 0 |
| ↓ | ↓ | ↓ | ↓ | ↓ |
| D5+$2^8$: | DATA | A2 | 0 | 0 |

| Addr | etype | base | count | alt |
|---|---|---|---|---|
| D6: | DATA | A2 | 1 | 0 |
| D6+1: | DATA | A2 | 0 | 0 |
| ↓ | ↓ | ↓ | ↓ | ↓ |
| D6+21: | PTR | D7 | 0 | 0 |
| D6+22: | DATA | A2 | 0 | 0 |
| ↓ | ↓ | ↓ | ↓ | ↓ |
| D6+$2^8$: | DATA | A2 | 0 | 0 |

| Addr | etype | base | count | alt |
|---|---|---|---|---|
| D7: | DATA | A2 | 1 | 0 |
| D7+1: | DATA | A2 | 0 | 0 |
| D7+127: | DATA | A2 | 0 | 0 |
| D7+128: | DATA | D8 | 0 | 0 |
| ↓ | ↓ | ↓ | ↓ | ↓ |
| D7+$2^8$: | DATA | D8 | 0 | 0 |

A2:

| Key Bits | Mask Field |
|---|---|
| 10.1.1.1.0.0.0.0.6.21.32767 | 255.255.255.255.0.0.0.0.255.255.32767 |

| Count | L1 Alt | L2 Alt | L3 Alt | L4 Alt | L5 Alt | L6 Alt | L7 Alt | L8 Alt | L9 Alt | Rule |
|---|---|---|---|---|---|---|---|---|---|---|
| 1148 | B1 | C1 | D1 | D2 | D3 | D4 | D5 | D6 | D7 | 3 |

D8:

| Key Bits | Mask Field |
|---|---|
| 10.1.1.0.0.0.0.0.6.21.32767 | 255.255.255.0.0.0.0.0.255.255.32767 |

| Count | L1 Alt | L2 Alt | L3 Alt | L4 Alt | L5 Alt | L6 Alt | L7 Alt | L8 Alt | L9 Alt | Rule |
|---|---|---|---|---|---|---|---|---|---|---|
| 128 | Null | Null | Null | Null | Null | Null | Null | Null | D7 | 2 |

*FIG. 11*

After Further Recursive Expansion Leads to LPM Table for All Rules (1, 2 & 3)
821

| Addr | etype | base | count | alt |
|---|---|---|---|---|
| D1: | DATA | A2 | 256 | 0 |
| D1+1: | DATA | A2 | 0 | 0 |
| ↓ | ↓ | ↓ | ↓ | ↓ |
| D1+172: | PTR | D2 | 0 | 0 |
| D1+173: | DATA | A2 | 0 | 0 |
| ↓ | ↓ | ↓ | ↓ | ↓ |
| D1+192: | PTR | E1 | 0 | 0 |
| D1+193: | DATA | A2 | 0 | 0 |
| ↓ | ↓ | ↓ | ↓ | ↓ |
| D1+$2^8$: | DATA | A2 | 0 | 0 |

A2:

| Key Bits | Mask Field |
|---|---|
| 10.1.1.1.0.0.0.0.6.21.128.0 | 255.255.255.255.0.0.0.0.255.255.128.0 |

| Count | L1 Alt | L2 Alt | L3 Alt | L4 Alt | L5 Alt | L6 Alt | L7 Alt | L8 Alt | L9 Alt | Rule |
|---|---|---|---|---|---|---|---|---|---|---|
| 1786 | B1 | C1 | D1 | D2 | D3 | D4 | D5 | D6 | D7 | 3 |

E7:

| Key Bits | Mask Field |
|---|---|
| 10.1.1.1.0.0.0.0.6.21.128.0 | 255.255.255.255.0.0.0.0.255.255.128.0 |

| Count | L1 Alt | L2 Alt | L3 Alt | L4 Alt | L5 Alt | L6 Alt | | | | Rule |
|---|---|---|---|---|---|---|---|---|---|---|
| 128 | E1 | E2 | E3 | E4 | E5 | E6 | | | | 1 |

| Addr | etype | base | count | alt |
|---|---|---|---|---|
| E1: | PTR | D3 | 1 | 0 |
| E1+1: | PTR | D3 | 0 | 0 |
| ↓ | ↓ | ↓ | ↓ | ↓ |
| E1+168: | PTR | E2 | 0 | 0 |
| E1+169: | PTR | D3 | 0 | 0 |
| ↓ | ↓ | ↓ | ↓ | ↓ |
| E1+$2^8$: | PTR | D3 | 0 | 0 |

| Addr | etype | base | count | alt |
|---|---|---|---|---|
| E2: | PTR | E3 | 1 | 0 |
| E2+1: | PTR | E3 | 0 | 0 |
| ↓ | ↓ | ↓ | ↓ | ↓ |
| E2+$2^8$: | PTR | E3 | 0 | 0 |

| Addr | etype | base | count | alt |
|---|---|---|---|---|
| E3: | PTR | E4 | 256 | 0 |
| E3+1: | PTR | E4 | 0 | 0 |
| ↓ | ↓ | ↓ | ↓ | ↓ |
| E3+$2^8$: | PTR | E4 | 0 | 0 |

| Addr | etype | base | count | alt |
|---|---|---|---|---|
| E4: | DATA | A2 | 256 | 0 |
| E4+1: | DATA | A2 | 0 | 0 |
| ↓ | ↓ | ↓ | ↓ | ↓ |
| E4+6: | PTR | E5 | 0 | 0 |
| E4+7: | DATA | A2 | 0 | 0 |
| ↓ | ↓ | ↓ | ↓ | ↓ |
| E4+$2^8$: | DATA | A2 | 0 | 0 |

| Addr | etype | base | count | alt |
|---|---|---|---|---|
| E5: | DATA | A2 | 255 | 0 |
| E5+1: | DATA | A2 | 0 | 0 |
| ↓ | ↓ | ↓ | ↓ | ↓ |
| E5+21: | PTR | E6 | 0 | 0 |
| E5+22: | DATA | A2 | 0 | 0 |
| ↓ | ↓ | ↓ | ↓ | ↓ |
| E5+$2^8$: | DATA | A2 | 0 | 0 |

| Addr | etype | base | count | alt |
|---|---|---|---|---|
| E6: | DATA | A2 | 1 | 0 |
| E6+1: | DATA | A2 | 0 | 0 |
| | DATA | A2 | 0 | 0 |
| E6+?: | DATA | E7 | 0 | 0 |
| E6+4: | DATA | A2 | 0 | 0 |
| ↓ | ↓ | ↓ | ↓ | ↓ |
| E6+$2^8$: | DATA | A2 | 0 | 0 |

FIG. 12

SYSTEM AND METHOD FOR IMPLEMENTING ACLS USING STANDARD LPM ENGINE

FIELD OF THE INVENTION

The present invention relates generally to a system and method for applying access control rules to packet traffic. More particularly, the present invention relates to a system and method for implementing Access Control Lists using a standard "Longest Prefix Match" (LPM) engine.

RELATED ART

Access Control Lists (ACLs) are used in routers to control the flow of packet traffic. An ACL consists of a set of access control (AC) rules, where each rule specifies some of the fields in packets (some of the bits in these fields are typically wildcarded), and the action to be taken for packets which conform to the rule. Packet traffic throughput is screened in order to see which AC rule (if any) is to be applied to the packet.

Most networking implementations (core, access, or enterprise) use a "Longest Prefix Match" (LPM) algorithm to implement Layer 3 (L3) forwarding. Layer 3 refers to the Network layer of the commonly-referenced multilayered communication model, Open Systems Interconnection (OSI). A router is an example of a layer 3 device, although some newer switches also perform layer 3 functions. The Internet Protocol (IP) address is an example of a layer 3 address. In the OSI communications model, the Network layer knows the address of the neighboring nodes in the network, packages output with the correct network address information, selects routes and Quality of Service, and recognizes and forwards to the Transport layer incoming messages for local host domains. Among existing protocols that generally map to the OSI network layer are the Internet Protocol (IP) part of TCP/IP and NetWare IPX/SPX. Both IP Version 4 and IP Version 6 (IPv6) map to the OSI network layer.

A table that is searched by an LPM engine is referred to as an LPM table. An LPM table is based on breaking the lookup key into a sequence of segments called "strides." The key, such as an IP address is an ordered set of values called a "tuple". Each of the ordered sets of values is separated by a delimiter, such as a comma or period. Often, the first stride corresponds to the first 16 bits of the key (denoted as a "subkey"), which serves as a lookup value into a $2^{16}$ entry subtable. The subtable corresponding to the first stride is referred to as the "Level 0 subtable" or the "L0 subtable." The LPM table has one L0 subtable. The second stride involves the next segment of N consecutive key bits (typically, the number of bits for the second stride is 8). These bits are used to address an entry in a lower subtable, referred to as the "L1 subtable." There are usually more than one L1 subtables, so that the L0 subtable entries correspond to different L1 tables. The next set of bits (i.e., 8 bits) are used to address an entry in an even lower subtable (each entry in the L1 subtables corresponding to an L2 subtable). For example, in a 6-table implementation, the six strides will serve as lookup values into subtables in levels L0 through L5 consecutively.

LPM engines are typically used when the lookup result does not always depend on the entire key. In Layer 3 forwarding, the forwarding address may not depend on the entire source address 32-bit source address. For example, consider the source IP address 150.215.017.009. Assuming this is part of a Class B network, the first two numbers (150.215) represent the Class B network address, and the second two numbers (017.009) identify a particular host on this network. In many forwarding rules, the forwarding address depends only on the subnet of the source address: in other words, the network host address is wildcarded. Assuming there is a single forwarding address corresponding to the subnet 150.215, then the L0 lookup would be sufficient to determine the forwarding address (with a particular implementation using strides of 16,8,8 respectively), and it would not be necessary to conduct the L1 and L2 lookups. On the other hand, if the first 16 bits of a source address do not match the first 16 bits of any forwarding rule, then it is not necessary to continue the lookup past L0. This early termination feature leads to faster lookups and smaller lookup tables.

Further memory savings may be achieved by compressing the subtables. This does not reduce the number of subtables, but it does reduce the memory required by each subtable.

Implementations of Access Control Lists (ACL) using LPM engines are typically challenged by exponential memory consumption and long lookup times. The longest prefix matching obtained in L3 forwarding is not useful in ACL's, because each of the concatenated fields in the lookup key may contain its own prefix, and the longest prefix may be irrelevant. Thus even if the first prefix matches exactly, it is still necessary to continue lookups in higher-level tables until all the prefixes have been matched or excluded from possible matches.

The memory consumption may be increased by the LPM construction mechanism. In some prior art implementations, the subtables are linked according to a simple tree structure. Although the structure is simple, memory is wasted because duplicate tables may exist at each level.

One approach to address these challenges is using Ternary Content Addressable Memory (T-CAM). Unlike standard computer memory (random access memory or RAM) in which the user supplies a memory address and the RAM returns the data word stored at that address, a T-CAM is designed such that the T-CAM searches its entire memory to see if a supplied data word is stored anywhere in the memory in a three state manner. If the data word is found, the T-CAM returns a list of one or more storage addresses where the word was found (and in some architectures, it also returns the data word, or other associated pieces of data). Thus, a T-CAM is the hardware embodiment of what in software terms would be called an associative array. Because a T-CAM is designed to search its entire memory in a single operation, it is much faster than RAM in virtually all search applications. One challenge of using T-CAM, however, is that it is more expensive than RAM. Unlike a RAM chip, which has simple storage cells, each individual memory bit in a fully parallel T-CAM must have its own associated comparison circuit to detect a match between the stored bit and the input bit. Additionally, match outputs from each cell in the data word must be combined to yield a complete data word match signal. Another challenge of T-CAM is that the additional circuitry increases the physical size of the T-CAM chip which increases manufacturing cost. The extra circuitry also increases power dissipation since every comparison circuit is active on every clock cycle.

BRIEF DESCRIPTION OF THE DRAWINGS

The present invention may be better understood, and its numerous objects, features, and advantages made apparent to those skilled in the art by referencing the accompanying drawings, wherein:

FIG. 10 shows further memory maps of exemplary table values resulting from the continued expansion of the tree shown in FIG. 7;

FIG. 11 shows memory maps of exemplary table values resulting from the expansion of the tree shown in FIG. 8;

FIG. 12 shows further memory maps of exemplary table values resulting from the continued expansion of the tree shown in FIG. 8;

DETAILED DESCRIPTION

Figure 1:
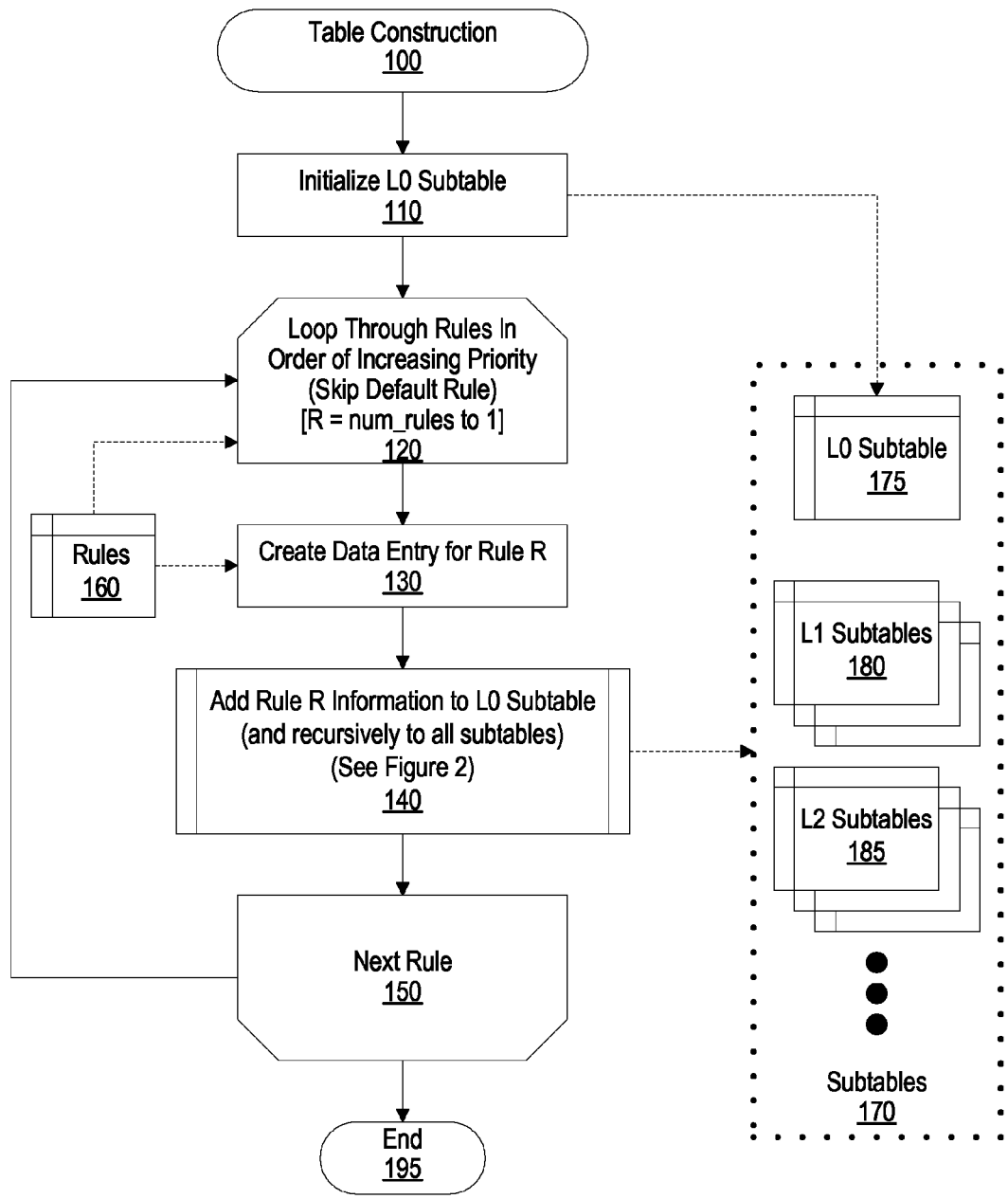
FIG. 1 is a high-level flowchart showing an improved method of table creation.

The following is intended to provide a detailed description of an example of the invention and should not be taken to be limiting of the invention itself. Rather, any number of variations may fall within the scope of the invention, which is defined in the claims following the description.

The method described herein identifies a rule corresponding to an incoming packet faster than prior art because of a novel early termination feature. A conventional LPM lookup can only terminate after examining all strides if the examined strides either (1) completely matches the prefix of an AC rule, or (2) does not match the prefix of any AC rule. In the present invention, only as many strides are examined as are required to rule out all possibilities except for one possible rule. If this point is reached for a key at level N, then the corresponding L(N) subtable entry does not point to another subtable (e.g., L(N+1)), but instead points to a data entry which is returned by the lookup engine.

In addition to returning a result (e.g., "ACCEPT," "DENY," etc.), the lookup engine also returns a remaining "candidate rule" (if one exists) that is verified against the key that was extracted from the incoming packet. The early termination feature mentioned above reduces the number of subtables required, thus reducing the amount of memory needed for the tables. In addition, an iterative table construction mechanism is used which reduces or eliminates duplicate subtables within the table.

An LPM table includes a number of subtables. Each subtable corresponds to a particular stride which is used as a lookup value. The key is divided into a number of subkeys. In one example embodiment the first subkey is a 16 bit value with remaining subkeys each being 8 bits values. Those of skill in the art will appreciate that any length subkeys can be used. In the example embodiment, the first subkey maps to a first subtable (L0) that has up to $2^{16}$ entries. Each of the remaining subtables would then have up to $2^8$ entries. Subtables may be compressed to save memory space. In one embodiment, the compression information is stored within the given subtables. The subtable entries are one of three types: a pointer value (PTR), a data value (DATA), and a failure indicator (FAIL). A PTR entry in a subtable points to a lower level subtable. In other words, a pointer value in an entry in the first subtable (L0) would point to one of the second (L1) subtables. Likewise, a PTR entry in the second subtable (L1) would point to one of the third (L2) subtables, and so on. A DATA entry in a subtable entry points to a stored rule.

In one embodiment, in order to create the various subtables, a data class called "entry" is defined which characterizes entries of the LPM table (e.g., entries in subtable L0, the L1 subtables, etc.). The following fields are used for each entry:

| | |
|---|---|
| entry.etype | type of entry (PTR, DATA, or FAIL); |
| entry.base | address of target subtable (if type PTR), address of data (e.g., the rule), if type DATA); |
| entry.entropy | compression information for target subtable (if type PTR); and |
| entry.stride | stride corresponding to target subtable. |

A class called "centry" is defined that inherits from class "entry" and adds the fields:

| | |
|---|---|
| centry.count | number of times that this entry is targeted by other entries in the table; and |
| centry.alt | address of an alternate subtable, used in case the new rule is effective (explained in further detail below). |

Each subtable that comprises the LPM table is an array of pointers to entry. To facilitate table building, the LPM table is first created with entries of data type centry: that is, these entries have associated fields count and alt as well as the fields etype, base, entropy, and stride which are associated with data type entry. Once this table with entries of type centry is constructed, the table information is copied into a table whose entries are of type entry. This second table is the one which is used for table operation (i.e., is used to lookup rules).

In this embodiment, during table construction, the rules are added to the table one by one. When a new rule is added, all of the alt fields in the table are reset to NULL. The table construction process is shown in FIGS. 1-4. FIG. 1 shows a high-level diagram of how tables are constructed. Processing commences at 100 whereupon, at step 110, the first (L0) subtable is initialized. In one embodiment, the key is comprised of a number of subkeys with the first subkey being a 16 bit value and the remaining subkeys being 8 bit values. In this embodiment, the first subkey, being a 16 bit value, maps to the first table which has $2^{16}$ entries (one entry for each possible value of the first subkey).

At step 120, a loop is initialized to loop through all of the rules in order of increasing priority. In practice, ACLs are built assuming the lower the rule number, the greater the rule priority. In other words, Rule 1 has a greater priority than Rule 2. If a given packet matches two rules, then the rule with the greatest priority is applied. Obviously, in other embodiments, the ordering of the rule priority can be reversed so that higher numbered rules have greater priorities (in other words, Rule 2 would have a greater priority than Rule 1). Step 120 therefore begins a loop to step through all of the rules in order of increasing priority (i.e., starting at the lowest priority and stepping through all the rules until the greatest priority rule is processed. At step 130, a data entry is created for the rule (R), which includes rule information. One embodiment of this rule entry is described in further detail below. Following this, the first (L0) subtable is modified (and recursively to all other subtables) so that they will correctly identify keys which conform to rule R (predefined process 140, see FIG. 2 and corresponding text for processing details). At step 150, the end of the loop is reached and the next rule is processed with processing looping back to create the data entry for the next rule and add the rule information to the first (L0) subtable and recursively to all other subtables where the information is needed. This looping continues until all rules have been processed, at which point step 150 branches to end 195.

Figure 2:
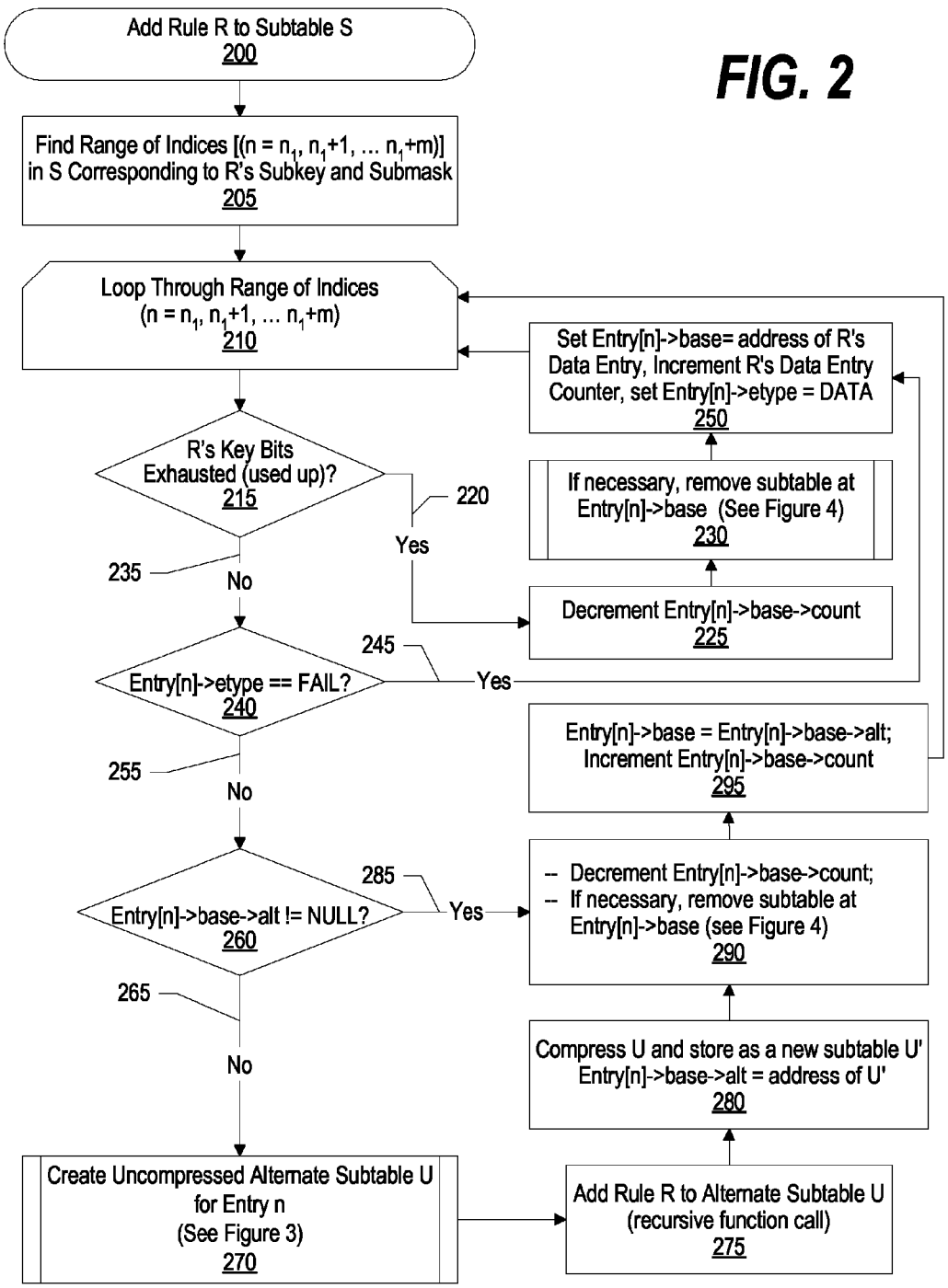
FIG. 2 is a flowchart showing the steps taken to add a rule to a subtable.
Figure 4:
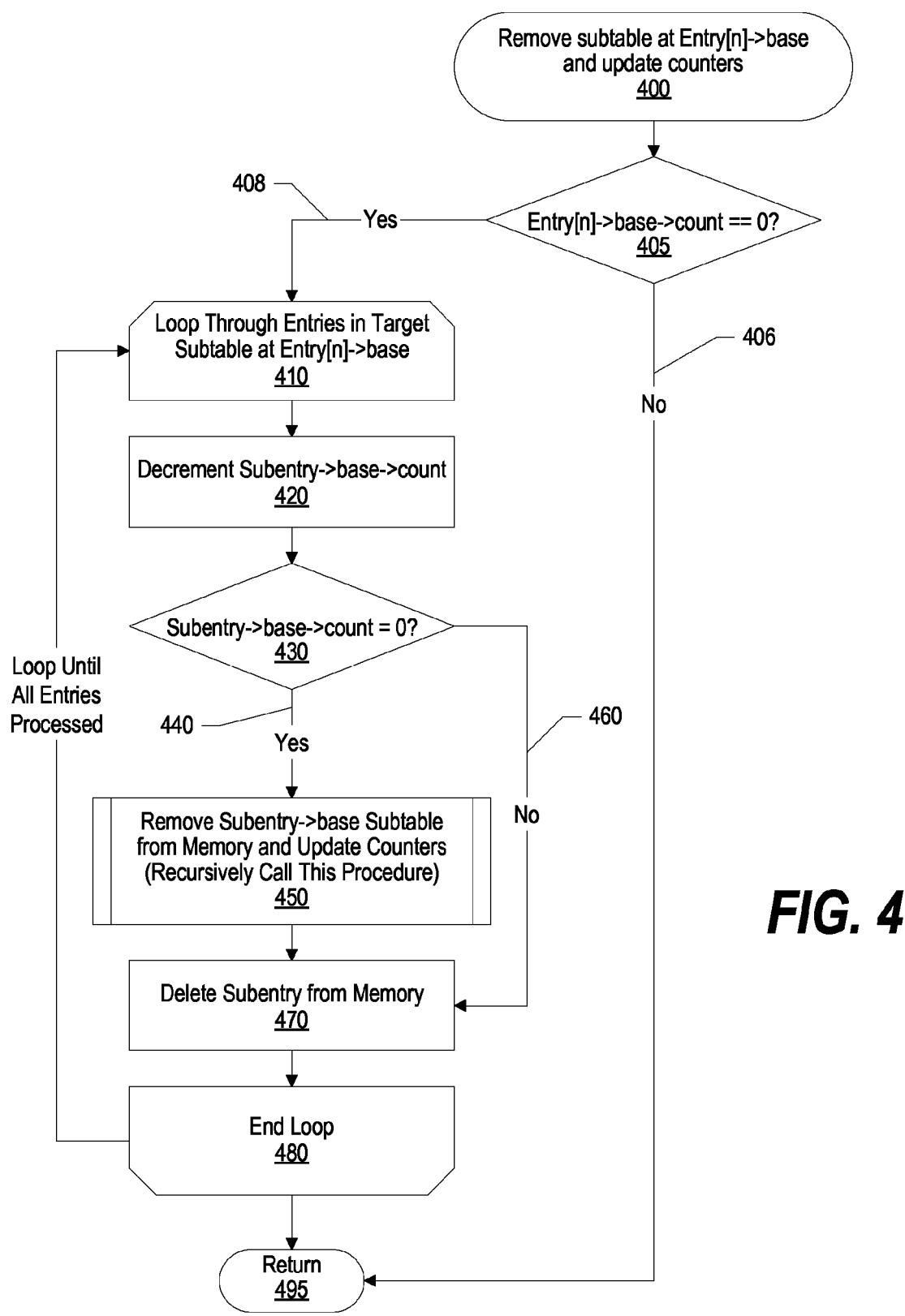
FIG. 4 is a flowchart showing the steps taken in removing an old entry from memory.

FIG. 2, as referenced from FIG. 1, details how rule information is added to the first subtable (L0) and other subtables that comprise the LPM table. Processing commences at 200 whereupon, at step 205, the range of indices in the selected subtable (e.g., L0, etc.) are found that correspond to the subkey and submask associated with the particular rule and stride. The subkey consists of the rule bits in the given stride; while the submask bits are '0' or '1' depending on whether the bits in those positions are wildcarded or not. After the range of indices has been determined at step 205, step 210 starts a loop that loops through the range of indices that were found. During the loop, a series of determinations is made to handle the indices. First, a determination is made as to whether the rules key bits have been exhausted (decision 215). The key bits are exhausted if all of the submasks for subsequent strides are completely wildcarded. If the rule's key bits have been exhausted, then decision 215 branches to "yes" branch 220 whereupon, at step 225, the count value for the subtable located at the address entry->base is decremented and, at predefined process 230, the subtable is removed from memory (if needed). FIG. 4 shows details of how a subtable is removed. Following this, at step 250 the entry's base field is set equal to the address of the data entry that was created for the rule at step 130 in FIG. 1. Processing then loops back to process the next range of indices.

Returning to decision 215, if the rule's key bits have not been exhausted, then decision 215 branches to "no" branch 235 whereupon another determination is made (decision 240). This time, the determination is as to whether the entry's type is equal to "FAIL" which indicates that up until now, this index did not correspond to a rule. If the entry's type is equal to "FAIL," decision 240 branches to "yes" branch 245 whereupon, at step 250, the entry's base field is set according to the address of the data entry that was created for the rule at step 130 in FIG. 1. Now, the entry's type will no longer be equal to "FAIL" but will be of DATA type. Processing then loops back to process the next range of indices.

Returning to decision 240, if the entry's type is not currently equal to "FAIL" (i.e., it is either a DATA type and points to a data value (e.g., ACCEPT or DENY), or it is a PTR type and already points to another subtable), then decision 240 branches to "no" branch 255 whereupon another decision is made (decision 260). This time, the determination made is as to whether the entry's alt field is not equal to NULL. If the entry's alt field is equal to NULL, then decision 260 branches to "no" branch 265 whereupon, at predefined process 270, an uncompressed alternate subtable is created for this entry (see FIG. 3 and corresponding text for processing details). At step 275, the rule is added to the alternate subtable that was created in predefined process 270 using a recursive function call to the routine shown if FIG. 2. At step 280, a compressed copy of the newly created subtable (created in step 275) is created, and the base field of Entry[N] points is set equal to the address of to the compressed version of the subtable. At step 290, the previous entry's counter is decremented, the entry is then set equal to the entry that points to the compressed subtable, and the new entry (pointing to a different subtable) is incremented. The incrementing and decrementing is performed to keep track of the number of entries that point to a particular subtable. In this manner, subtables that are no longer referenced can be removed from memory (predefined process 295, see FIG. 4 and corresponding text for processing details). Processing then loops back to process the next range of indices.

Returning to decision 260, if the entry's centry.alt value field of Entry[n] is not equal to NULL (indicating that the rule is not a new rule), then decision 260 branches to "yes" branch 285 and step 290 and predefined process 295 are performed as described above. Processing then loops back to process the next range of indices. When all ranges of indices have been processed, the processing shown in FIG. 2 returns to the calling routine (either FIG. 1 or, in the case of a recursive function call, to a different instance of FIG. 2).

Figure 3:
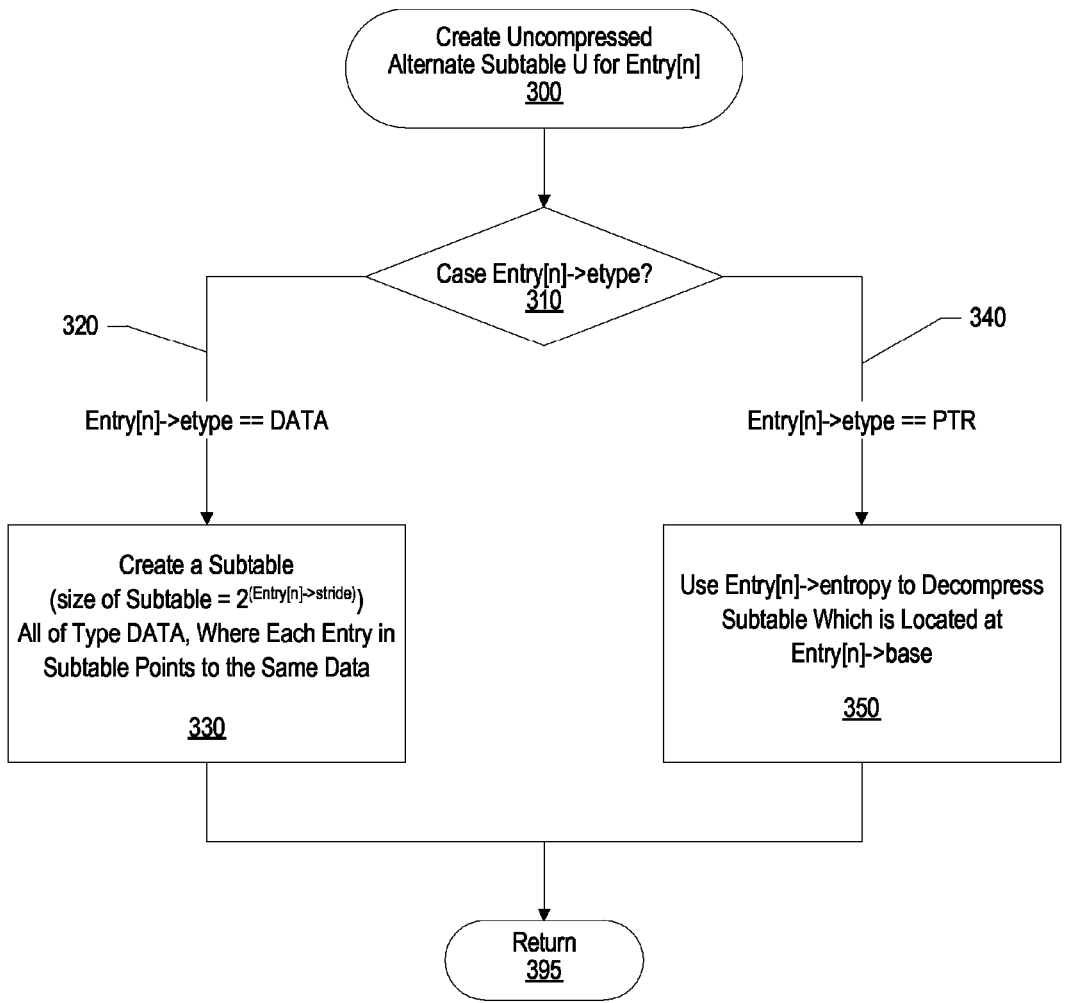
FIG. 3 is a flowchart showing the steps taken in creating an uncompressed alternate subtable.

FIG. 3 shows the steps taken to create an uncompressed alternate subtable (U) for a given entry. This routine is called from predefined process 270 shown in FIG. 2. FIG. 3 processing commences at 300, whereupon a determination is made as to the type of entry being processed (decision 310). If the entry is type "DATA," then this is a new subtable that is being created and decision 310 branches to branch 320 whereupon, at step 330, a subtable is created where every entry in the new subtable is of type DATA and where each entry in the subtable points to the same data (e.g., each entry points to an ACCEPT or each entry points to a DENY). The size of the subtable is $2^{(Entry[n]->stride)}$. In other words, if the stride is 8 bits, then the size of the subtable is $2^8$ entries. On the other hand, if the type of entry is a PTR (pointer), then this subtable already exists in a compressed form and the existing subtable should be decompressed. In this case, decision 310 branches to branch 340 whereupon, at step 350, entry[n]->entropy is used to decompress the subtable that is referenced by entry[n]->base. Processing thereafter returns to the calling routine (see FIG. 2) at 395.

As previously mentioned, a field (entry.entropy) is used to store compression information for the subtable If a subtable is able to store 256 entries, then, in one embodiment, the entropy filed is 32 bits long (bit $b_0$ to bit $b_{31}$). Each of these bits corresponds to 8 entries in the subtable (i.e., bit $b_0$ corresponding to the first 8 entries, bit $b_1$ corresponding to the next 8 entries, etc.). If all 8 entries that correspond to an entropy bit are the same (e.g., the first 8 entries are all the same), then the entropy bit is set to one value (e.g., '0'), otherwise they are set to the other bit value (e.g., '1'). A compressed table only stores a single entry if the entropy bit indicates that the corresponding entries are the same. For example, if the first 8 entries (entries 0 through 7) are all the same, then the first entry (entry 0) is stored. However, at least one entry in the group is different from the others, then all entries are stored and the entropy bit indicates that the corresponding entries are not compressed. In some cases (e.g., when a subtable is first created), all the entries in the subtable will be the same. In this case, the 32 bit entropy field will indicate that all entries are compressed (e.g., the entropy field will be all zeros), and the compressed subtable will only contain 32 entries rather than the 256 entries of a full table.

In a second example, suppose a table consists of 10 entries equal to "A," followed by 118 entries equal to "B," followed by 128 entries equal to "C." The entropy field in this case is as follows:

0 1 0 0 0 . . . 0. (The '1' comes because bits e8 . . . e15 are not all equal)

The compressed table is then:

A A A B B B B B B B . . . B C . . . C (3 A's, 20 B's, 16 C's for a total of 39 entries).

To perform a lookup in the compressed table, the hardware (Table Lookup Unit, or TLU) reads the entropy field, and uses the entropy field to interpret the bits of the compressed table. For instance, to look up the $16^{th}$ entry of the table in the second example, the TLU reads a '0' as the first entropy, so it knows that the first compressed table entry ("A") actually represents the first 8 entries of the table. The TLU then reads a '1' as the second entropy bit, and therefore knows that the next 8 entries in the compressed table represent distinct entries in the actual table (e.g., entries 9 through 16). The TLU thus correctly interprets the $9^{ath}$ stored entry as the $16^{th}$ entry of the table.

FIG. 4 is a flowchart that details the steps taken when a subtable is removed from memory during the table construction, if needed. Processing commences at 400 whereupon, a determination is made as to whether the counter that keeps track of the number of times the subtable is referenced has been decremented to zero, indicating that no entries are referencing the subtable (decision 405). If the counter is not zero, indicating that one or more entries still reference the subtable, then the subtable cannot be removed and decision 405 branches to "no" branch 406 bypassing the remaining steps with processing returning to the calling routine at 495.

On the other hand, if the counter has been decremented to zero, decision 405 branches to "yes" branch 408 whereupon, at step 410, a loop is initiated to loop through all of the entries in a target subtable that is is stored in memory beginning at the address (entry[n]->base). For each entry in the subtable (denoted by Subentry), the counter for the subtable whose address is indicated by the base field (Subentry->base) is decremented at step 420 indicating that one fewer entries points to this subtable. A determination is made as to whether the counter has been decremented to zero (decision 430). If the counter has been decremented to zero, decision 430 branches to "yes" branch 440 whereupon this routine is recursively called to remove the subtable from memory and update the counters accordingly (predefined process 450), and the entry denoted Subentry is removed from memory at step 470. On the other hand, if the counter has not decremented to zero, decision 430 branches to "no" branch 460 bypassing predefined process 450 and branching to the step that deletes the subentry from memory (step 470). The end of the loop is encountered at step 480. Processing loops back until all entries in the target subtable have been processed, at which point, step 480 branches to return 495 whereupon processing returns to the calling procedure (either this procedure if it was recursively called in predefined process 450 or FIG. 2).

Figure 5:
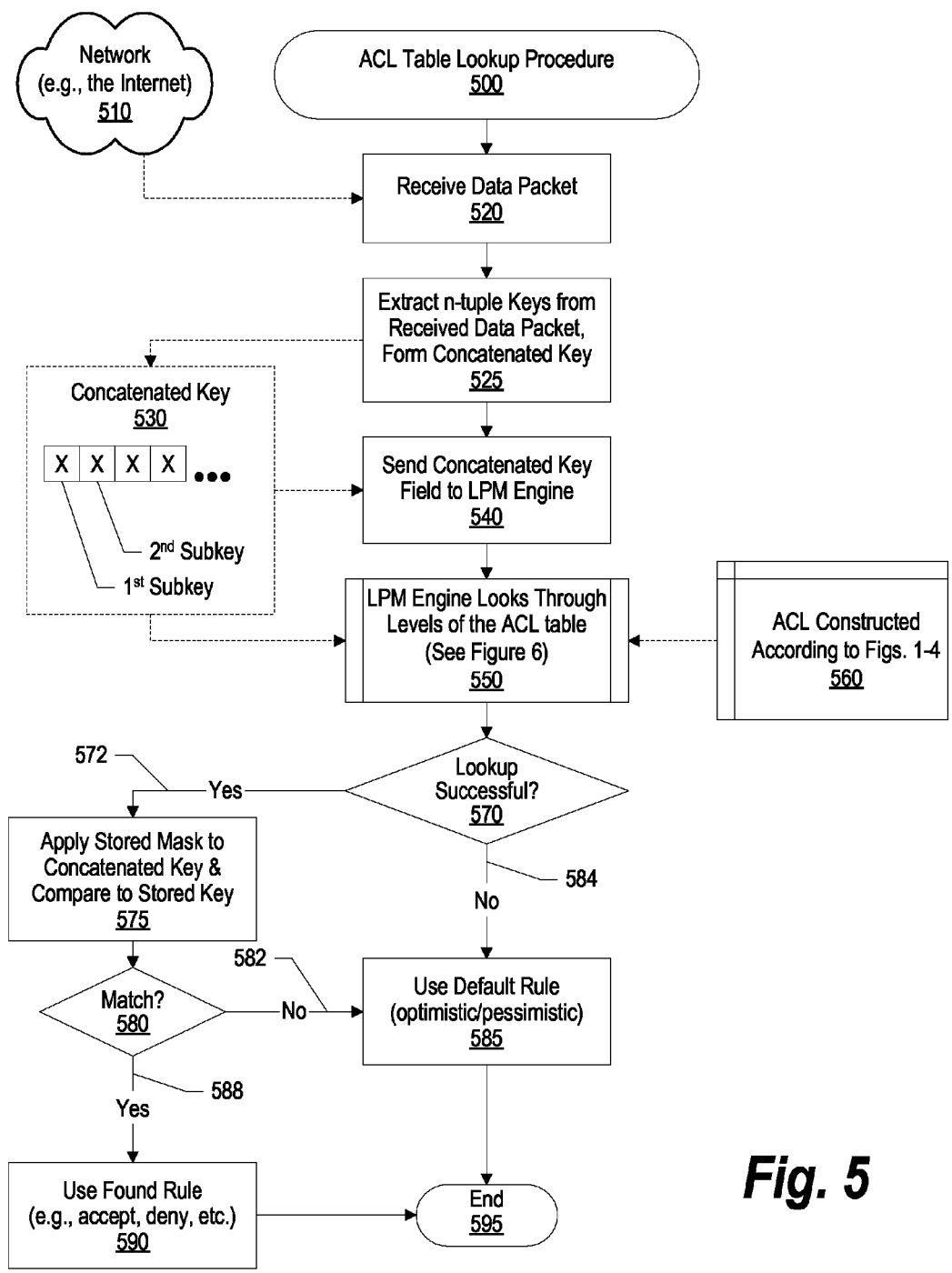
FIG. 5 is a diagram showing the steps taken to lookup a rule that has been stored using the construction methods provided in FIGS. 1-4.

FIG. 5 is a flowchart showing the steps taken to make an ACL determination on a data packet using an LPM table that has been stored using the construction methods provided in FIGS. 1-4. Processing commences at 500 whereupon, at step 520, a packet is received. In one embodiment, the packet is received from computer network 510, such as the Internet. The packet includes a number of fields of values that, in one embodiment, these fields correspond to a destination address, a source address, a protocol, a destination port, and a source port. The number and size of the fields used to create the key can vary based on the application and fields that are available.

At step 525, the fields used to form the key are extracted from the data packet, forming concatenated key 530. The concatenated key includes a number of subkeys that roughly correspond to the fields used to form the concatenated key. However, some fields, especially longer fields, may include more than one subkey. At step 540, concatenated key 530 is sent to the LPM Engine. The LPM Engine can be implemented in either hardware or software. In the embodiment shown, the LPM Engine is implemented in hardware, which may increase the speed of looking through the LPM table. In an alternative embodiment, the LPM Engine is implemented in software which may allow for easier modifications of the LPM Engine which is may be helpful is some environments. In either case, the LPM Engine looks through the various levels of Table 560 (constructed according to the flowcharts shown in FIGS. 1-4 and their corresponding descriptions) for a matching rule (predefined process 550, see FIG. 6 and corresponding text for processing details).

After the LPM Engine has performed the lookup using the concatenated key, a determination is made as to whether the lookup was successful (decision 570). If the lookup was successful, decision 570 branches to "yes" branch 572 whereupon, at step 575, the key from the data packet is compared with the key stored in the table. As shown in FIGS. 1-4, the table is only constructed to the extent needed to uniquely distinguish each rule from all of the other rules. This is different from prior art solutions that construct the table with subtables at all levels until the key is exhausted, that is, all subkeys at higher levels are completely wildcarded. One property of table 560 is that it takes up less memory and is faster to search than a traditional table. Another property of ACL 560 is that it will yield false positives. False positives are possible because not all of the incompletely-wildcarded subkeys are necessarily stored in the table. At step 575, the concatenated key is masked using the stored mask resulting in a masked concatenated key. The masked concatenated key is then compared to the stored key. A determination is made as to whether the masked concatenated key matches the full key stored in the ACL (decision 580). A false positive has occurred if the masked concatenated key does not match key stored in the ACL, in which case decision 580 branches to "no" branch 582 leading to step 585. Likewise, if the ACL lookup was not successful (decision 570, indicating that the concatenated key is not in the ACL), then decision 570 branches to "no" branch 584, also leading to step 585. At step 585, a default rule is applied to the packet. In an optimistic environment, a default rule can be established to "accept" packets if there is not a rule denying such packets. Conversely, in a pessimistic environment, a default rule can be established to "deny" packets unless there is a rule that accepts such packets. Returning to decision 580, if the masked concatenated key matches the stored key, then decision 580 branches to "yes" branch 588 whereupon, at step 590, the rule that was found is applied to the packet (i.e., accepting the packet, denying the packet, or performing additional processes on the packet). After the packet has been processed using either a found rule or a default rule, processing ends at 595.

Figure 6:
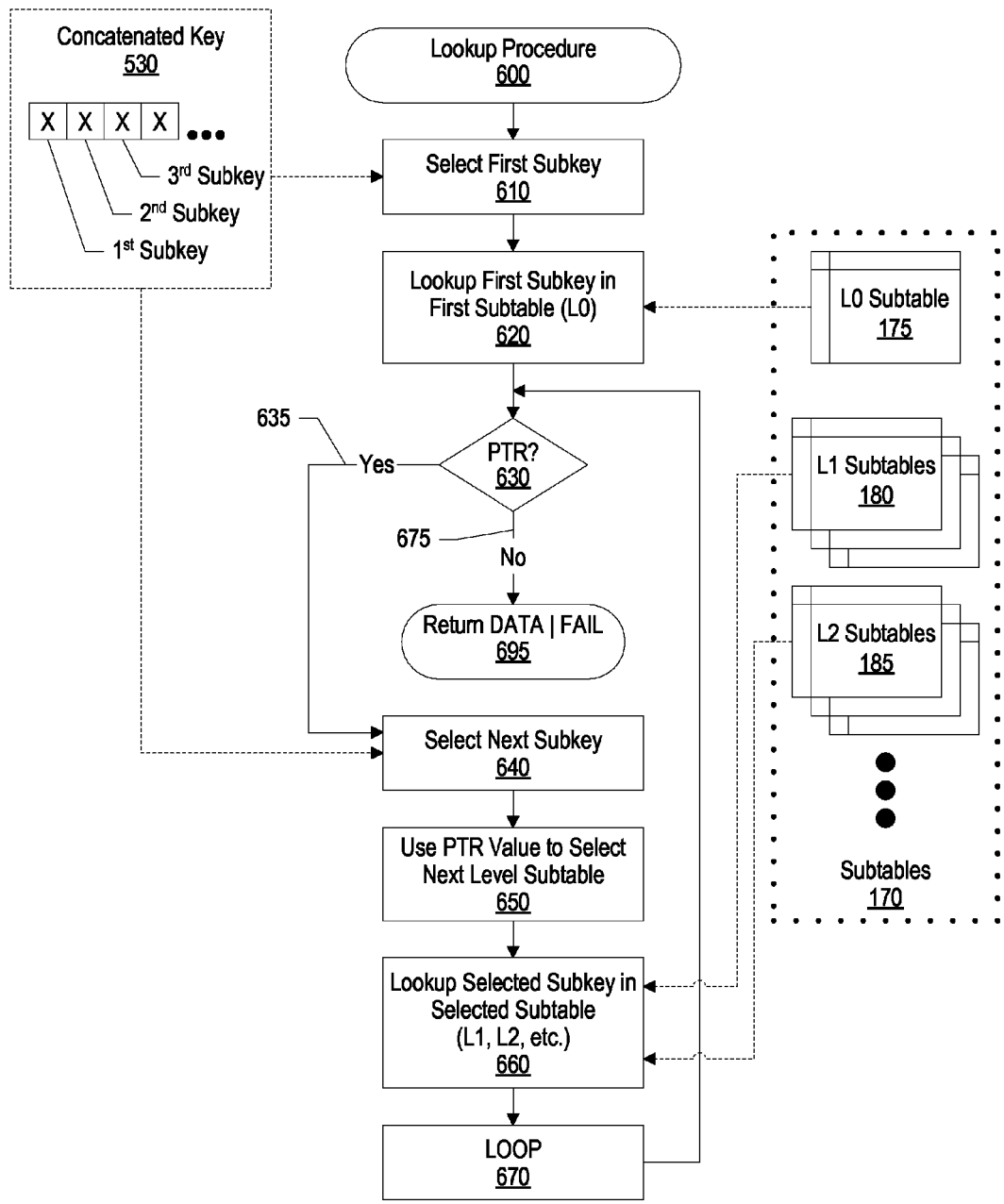
FIG. 6 is a diagram showing an example rule set and the resulting tree to accommodate two example rules.

FIG. 6 is a flowchart showing details of the lookup procedure used by the LPM Engine. Processing starts at 600 whereupon, at step 610, the first subkey is selected from concatenated key 530. In one embodiment, the first subkey is a 16 bit value and subsequent subkeys are each 8 bit values. At step 620, the procedure looks up the first subkey in the first (L0) subtable 175. In one embodiment where the first subkey is a 16 bit value, the first subtable is a single table that is up to $2^{16}$ bits in length. Each entry of each subtable includes a key and various other fields:

| | |
|---|---|
| entry.etype | type of entry (PTR, DATA, or FAIL); |
| entry.base | address of target subtable (if type PTR), address of data (e.g., the rule), if type DATA); |
| entry.entropy | compression information for target subtable (if type PTR); and |
| entry.stride | stride corresponding to target subtable. |

A determination is made as to whether the entry type of the entry that was found from the lookup of step 620 is a pointer to another subtable (decision 630). If the entry type (entry-.etype) that was found is a pointer, then decision 630 branches to "yes" branch 635 to perform another lookup in another subtable. At step 640, the next subkey is selected from concatenated key 530. In one embodiment, the subkeys subsequent to the initial subkey are each 8 bit values. At step 650, the pointer value (entry.base) is used to identify the next subtable. If the pointer value is in an entry for the first subkey, then the pointer will point to one of the L1 subtables (180). Likewise, if the pointer value is in an entry corresponding to the second subkey, then the pointer will point to one of the L2 subtables (185). At step 660, the selected subtable is searched for the selected subkey (e.g., one of the L1 subtables is searched for the second subkey, etc.). In one embodiment, the subtables are compressed. Compression information is stored in the previous entry (e.g., the entry in the L0 subtable includes entry.entropy that provides compression information for the targeted L1 subtable). In one embodiment, the subtable is not fully decompressed. Instead, the compression information is used to interpret the compressed subtable, in order to find the appropriate entry in the compressed subtable. At step 670, processing loops back to process the results from the latest lookup. Again, if the entry found is a pointer then decision 630 will branch to "yes" branch 635 and perform steps 640-670. Processing will continue until one of the lookups does not find an entry that points to another subtable. At this point, decision 630 will branch to "no" branch 675 and processing will return to the calling routine (see FIG. 5) with either the data located or a fail condition (return 695). If data is located, the data may include the rule data (e.g., "accept," "deny," etc.) or may be a pointer to a rule that is stored in a separate table. The rule also includes the bits of the key and mask so that a subsequent comparison can take place (see step 575 in FIG. 5). When a fail condition is encountered, it signifies that none of the rules currently stored in the ACL table (subtables 170) match the concatenated key included in the packet. In one embodiment, the following fields are included in a rule data entry, (i.e. this is the data which is returned to the calling routine):

| | |
|---|---|
| key bits | Size depends on the subkey (tuple set). In one embodiment the first subkey is a 16 bit value and subsequent subkeys (strides) are each 8 bit values; |
| mask field | Variable length binary encoded or bit map mask field. Again, size of the mask field depends on the subkey (tuple set); |
| rule number | (optional) unique rule number for each rule - depends on the number of rules included in the ACL; |
| default | (optional) default behavior (e.g., accept, deny, etc.) used when the rule does not match the concatenated key. This can be a one bit field (e.g., 0=Deny, 1=Accept). |
| match | behavior when the rule matches the concatenated key. This can also be a one bit field (e.g., 0=Deny, 1=Accept). |

Figure 7:
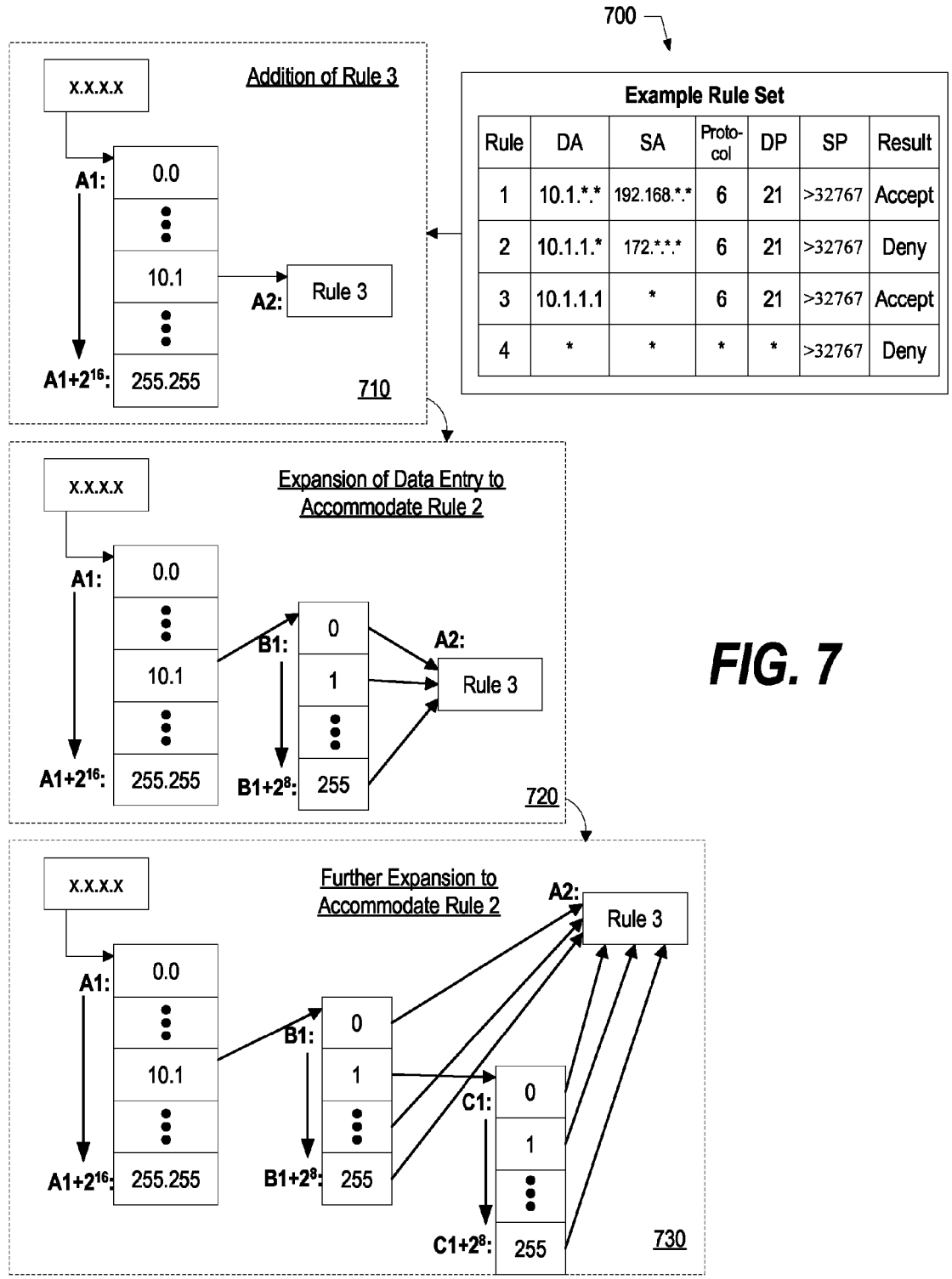
FIG. 7 is a diagram showing the expansion of the tree to accommodate three example rules.
Figure 8:
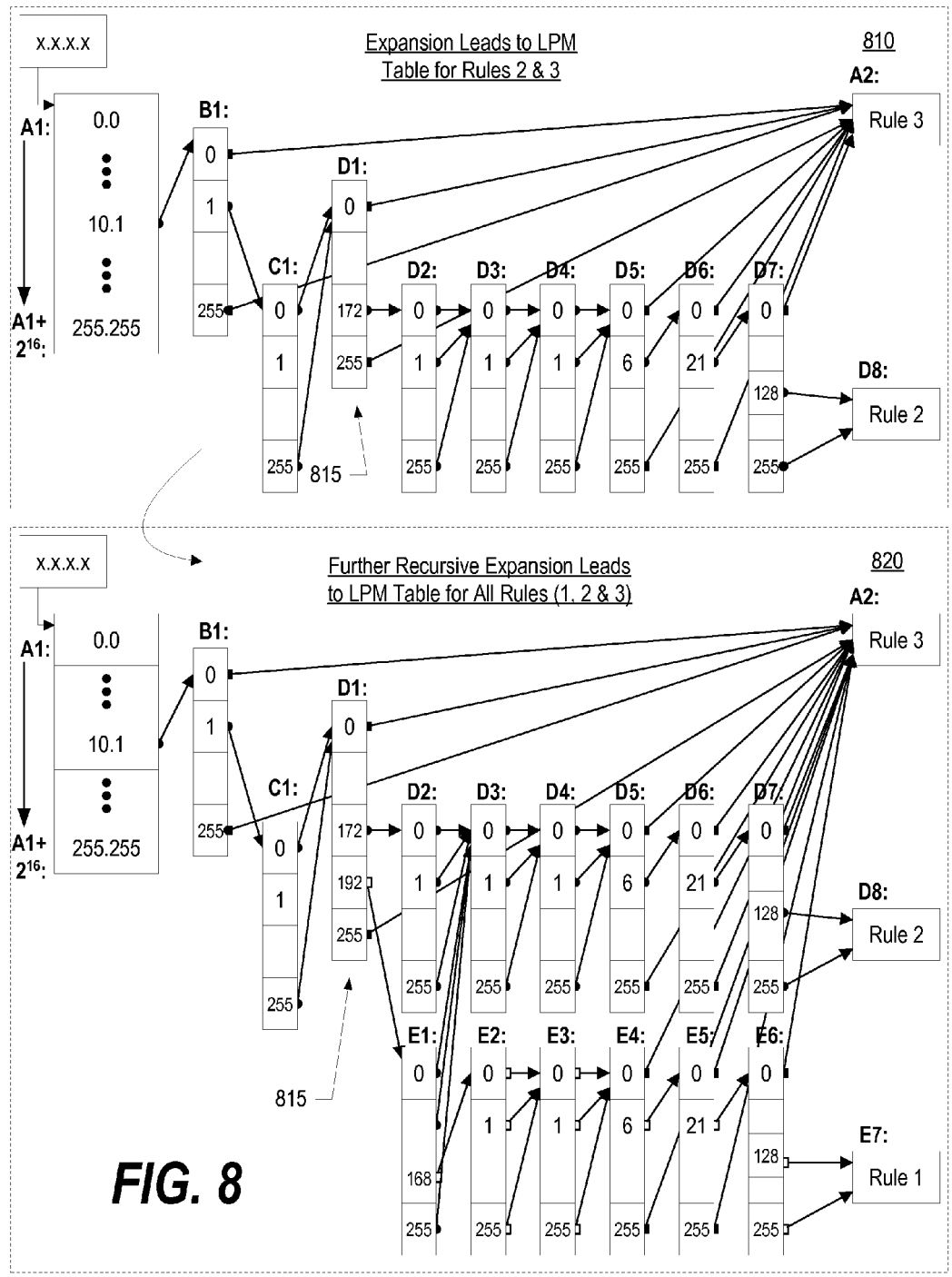
FIG. 8 is a block diagram of a data processing system in which a preferred embodiment of the present invention may be implemented.

In the case of an IPv4 implementation, the rule entry can be as small as 126 bits in length. In addition, fewer subtables are needed as compared with the subtable requirements of the prior art. In FIGS. 7 and 8, an example rule set is shown along with the resulting rule set using the subtable creation steps detailed in FIGS. 1-4.

FIG. 7 shows an example rule set of four rules (rule set 700). Example rule set 700 includes seven fields. "Rule" is the rule precedence. "DA" is the destination address. "SA" is the source address. Protocol is the protocol being requested. "DP" is the destination port, and "SP" is the source port. "Result" is the rule to invoke (in the example, the result is to either accept or deny the packet). If a packet's concatenated key matches more than one Rule, the Rule with the highest precedence is used. For example, a packet may match Rules 1, 3, and 4, in which case Rule 1 is used.

Figure 9:
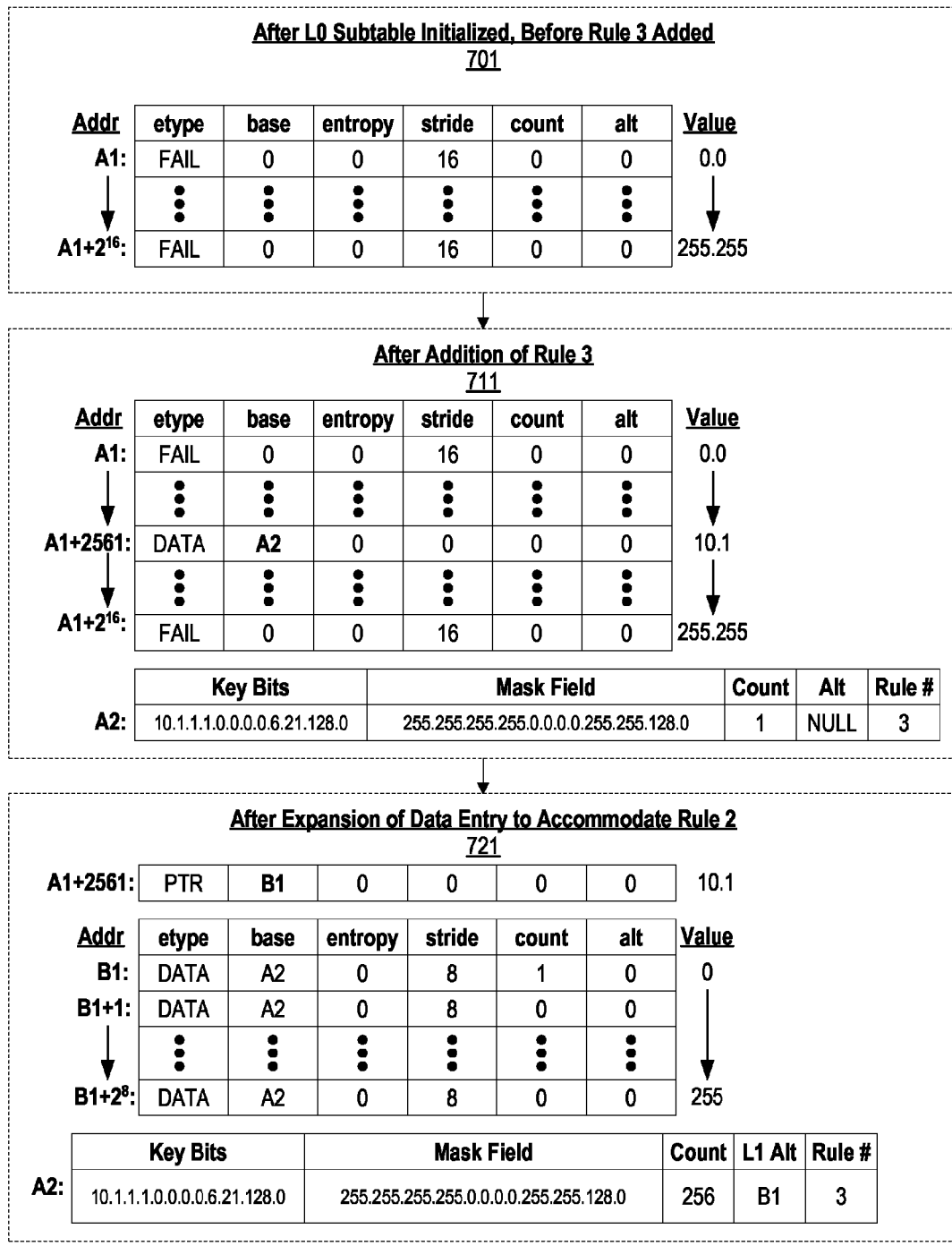
FIG. 9 shows memory maps of exemplary table values resulting from the expansion of the tree shown in FIG. 7.

In the example, Rule 4 has the lowest precedence. If a packet only matches Rule 4, then the packet is denied (the result of Rule 4). Rule 4 is treated as a FAIL lookup result. Subtable 710 shows the addition of Rule 3. The addition of Rule 3 includes enough information to the subtables to differentiate Rule 3 from Rule 4. Subtable 710 (also known as the L0 subtable) has $2^{16}$ entries. The addresses of the L0 subtable entries includes A1: through A1+$2^{16}$. When the L0 subtable is initialized, its address space is initialized as shown in memory map 701 shown on FIG. 9. Note that when the L0 subtable is initialized, each entry type (etype) is initialized to "FAIL" indicating that no entries reference a rule or another subtable. After Rule 3 has been added (subtable 710 in FIG. 7), the resulting memory map is shown in memory maps 711 shown in FIG. 9. Note that now one of the memory fields is now set to "DATA" indicating that this field (which corresponds to decimal value 10.1) references a rule. Note also that the base value for this entry points to memory address A2. A2, the memory area that stores Rule 3, is also shown in memory maps 711. The Rule is shown with key bits, a mask field, a count, an alt field, and the rule number. The key bits have values corresponding to rule 3 from Example Rule Set 700 and the mask field has a value of 255 for each field that is not wildcarded and a value of 0 for each field that is wildcarded. Note that in memory area A2, the count has been set to "1" because one entry references this rule entry.

Returning to FIG. 7, the addition of Rule 2 requires multiple stages. First, the data entry at L1 is expanded as shown in subtables 720. The corresponding memory area for the new B1 subtable is shown in memory maps 721 in FIG. 9. In memory maps 721, note that the entry in the L0 subtable is now a pointer (PTR) type entry that points to address B1. The new L1 subtable is $2^8$ entries long. Each of the entries in the new L1 subtable (B1: to B1+$2^8$) is type "DATA" and each points to Rule memory area A2. Note that the first entry (B1) has a count of "1" because one entry from the L0 subtable (A1+2561) points to the L1 subtable. Also note that the count field of the Rule entry A2 is 256 because all of the B1 entries point to this Rule entry. Further note that one of the fields in Rule entry A2 indicates that an alternate subtable (L1 Alt) has been created with the address of the L1 subtable (B1) provided.

Returning to FIG. 7, subtables 730 shows the further expansion needed to accommodate Rule 2 by expanding the appropriate level 1 entry. As in this example, level 0 (L0) refers to the first subtable (entries 0.0 through 255.255) which has a 16 bit key index with subsequent levels (level 1 (L1), level 2 (L2), etc.) each having an 8 bit key index. Memory maps 731 on FIG. 10 show the resulting memory used to perform the expansion shown in subtables 730. Note that one of the L1 entries (B1+1) is now a pointer to the L2 subtable C1:. This entry now has a type of pointer (PTR) and a base of C1 that references the C1: subtable. The L2 subtable (C1) is also $2^8$ entries long. The first entry (C1:) has a count of "1" indicating that one entry (B1+1:) references this subtable. The memory used to store the rule (A2) now has a count of 511 because all 256 of the L2 entries (C1:) and 255 of the 256 L1 entries (B1:) reference this rule. Also note that the rule memory now has two alt fields: L1 alt referencing the B1 subtable, and L2 alt referencing the C1 subtable.

FIG. 8 shows a continuation of the recursive expansion of the tables used to accommodate all of the Rules (Rules 1-4). Subtables 810 shows the differentiation of packets with a destination address beginning with 10.1.1 but a source address of 172.*.*.* pointing to Rule 2 rather than Rule 3 (subtable 815). Memory maps 811 on FIG. 11 show the memory maps resulting from the expansion shown in 810, including subtable 815. L3 through L9 subtables are at memory locations D1: through D7. A new rule memory area is at D8 for storing Rule 2. Note the Rule 3 subtable has an increased count as well as several additional alt fields that reference the newly created subtables. The Rule 2 memory area (D8:) references one new L9 subtable in its L9 Alt field (referencing the D7: subtable). The count of the D8: rule is 128 as half of the entries in the D7 subtable reference Rule 2. In addition, note that the key bits field and the mask field of the Rule 2 memory correspond to Rule 2 set forth in Example Rules 700, shown in FIG. 7.

Returning to FIG. 8, subtables 820 shows the final expansion of the subtables to accommodate Rule 1 where the source address of 192.168.*.* pointing to Rule 1 rather than either Rule 2 or Rule 3 (see subtable 815). The resulting memory maps 821 are shown on FIG. 12. Memory map E7: shows the values for new Rule 1. Note the alt subtables included in the Rule 1 entry for the new subtables (E1 through E6). The number of subtables may appear to be large, however, many of the subtables are either trivial (i.e. all point to the same entry) or have numerous duplicate entries. Using compression, such tables require little memory. In the example tables created in FIGS. 7 and 8 using the process described in FIG. 1-4, new centry are created only when necessary. Note there are no duplicate subtables. If during the process of table-building a centry counter becomes 0 (indicating that no other entries point to this entry), then the centry is removed from the table, and other centry counters are updated.

Figure 13:
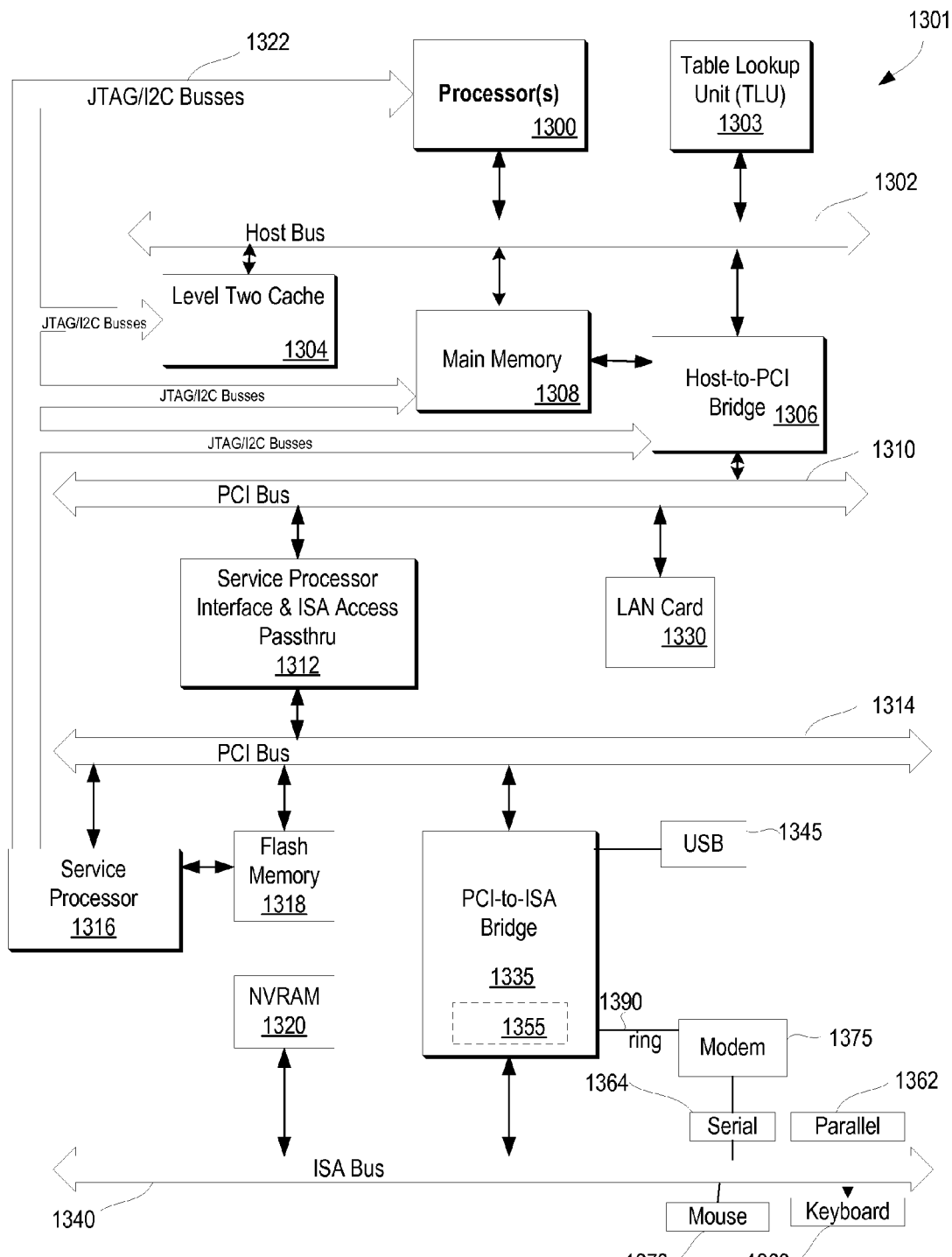
FIG. 13 is a block diagram of a data processing system in which an embodiment of the present invention may be implemented

FIG. 13 illustrates data processing system 1301 which is a simplified example of a data processing system capable of performing the computing operations of the host computer described herein with respect to one embodiment of the present invention. Data processing system 1301 includes processor 1300 which is coupled to host bus 1302. A table lookup unit (TLU 1303) and a level two (L2) cache memory 1304 are also coupled to host bus 1302. Host-to-PCI bridge 1306 is coupled to main memory 1308, includes cache memory and main memory control functions, and provides bus control to handle transfers among PCI bus 1310, processor 1300, L2 cache 1304, main memory 1308, and host bus 1302. Main memory 1308 is coupled to Host-to-PCI bridge 1306 as well as host bus 1302. Devices used solely by host processor(s) 1300, such as LAN card 1330, are coupled to PCI bus 1310. Service Processor Interface and ISA Access Pass-through 1312 provide an interface between PCI bus 1310 and PCI bus 1314. In this manner, PCI bus 1314 is insulated from PCI bus 1310. Devices, such as flash memory 1318, are coupled to PCI bus 1314. In one implementation, flash memory 1318 includes BIOS code that incorporates the necessary processor executable code for a variety of low-level system functions and system boot functions.

PCI bus 1314 provides an interface for a variety of devices that are shared by host processor(s) 1300 and Service Processor 1316 including, for example, flash memory 1318. PCI-to-ISA bridge 1335 provides bus control to handle transfers between PCI bus 1314 and ISA bus 1340, universal serial bus (USB) functionality 1345, power management functionality 1355, and can include other functional elements not shown, such as a real-time clock (RTC), DMA control, interrupt support, and system management bus support. Nonvolatile RAM 1320 is attached to ISA Bus 1340. Service Processor 1316 includes JTAG and I2C buses 1322 for communication with processor(s) 1300 during initialization steps. JTAG/I2C buses 1322 are also coupled to L2 cache 1304, Host-to-PCI bridge 1306, and main memory 1308 providing a communications path between the processor, the Service Processor, the L2 cache, the Host-to-PCI bridge, and the main memory. Service Processor 1316 also has access to system power resources for powering down information handling device 1301.

Peripheral devices and input/output (I/O) devices can be attached to various interfaces (e.g., parallel interface 1362, serial interface 1364, keyboard interface 1368, and mouse interface 1370 coupled to ISA bus 1340. Alternatively, many I/O devices can be accommodated by a super I/O controller (not shown) attached to ISA bus 1340.

In order to attach data processing system 1301 to another computer system to copy files over a network, LAN card 1330 is coupled to PCI bus 1310. Similarly, to connect data processing system 1301 to an ISP to connect to the Internet using a telephone line connection, modem 1375 is connected to serial port 1364 and PCI-to-ISA Bridge 1335.

While the data processing system described in FIG. 13 is capable of executing the processes described herein, this data processing system is simply one example of a data processing system. Those skilled in the art will appreciate that many other data processing system designs are capable of performing the processes described herein.

Figure 14:
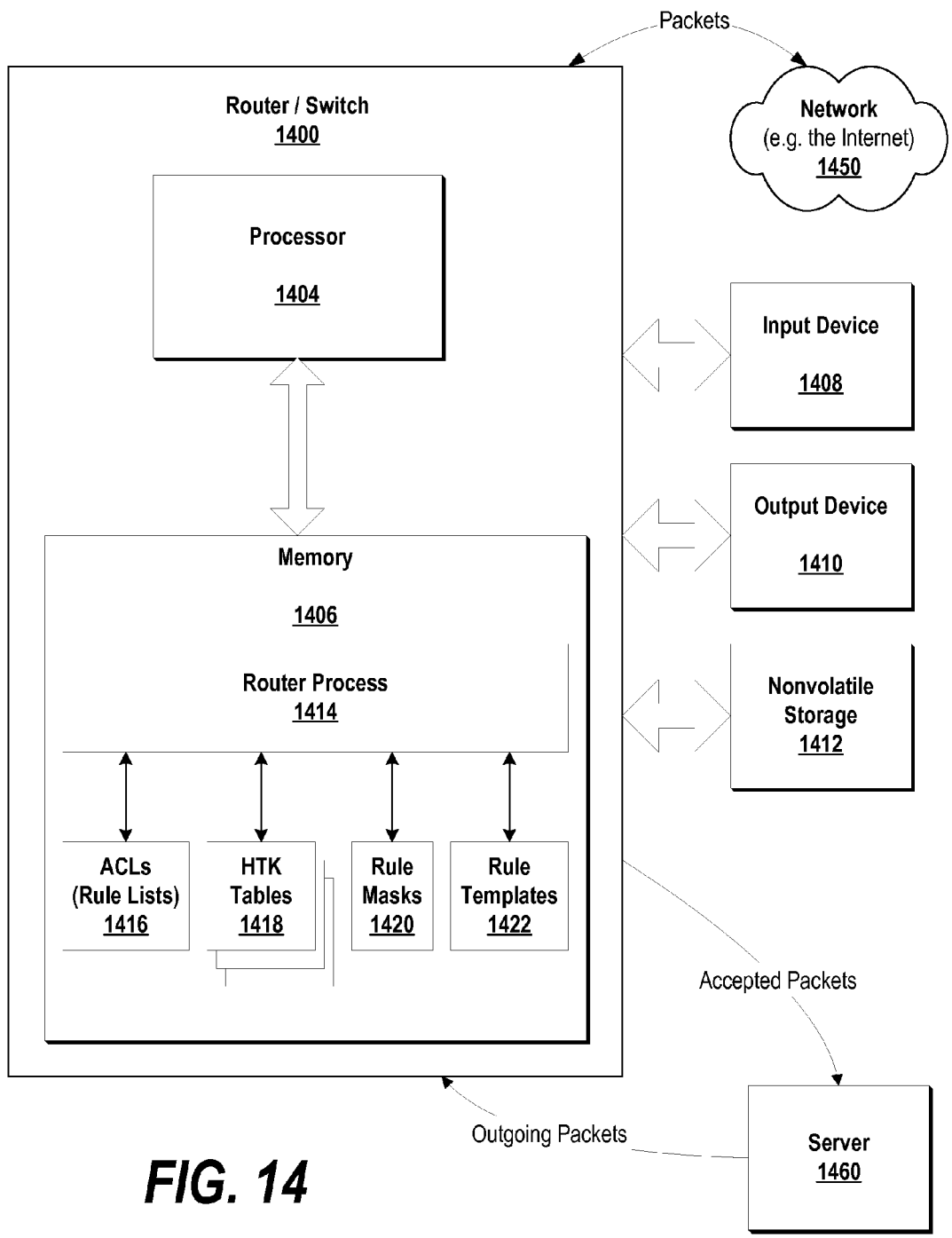
FIG. 14 is a block diagram of a router in which an embodiment of the present invention may be implemented.

FIG. 14 illustrates router 1400 which is a simplified example of a router capable of performing the routing operations described herein. Router 1400 is a specialized data processing system that includes a processor, or processors 1404, and a memory 1406. Router management process 1414 is shown to be resident in memory 1406 and manages Rule Lists (ACLs 1416), HTK tables 1418, Rule Masks 1420, and Rule Templates 1422, as described herein in order to manage access. An input device 1408 and an output device 1410 are connected to computer system 1402 and represent a wide range of varying I/O devices such as disk drives, keyboards, modems, network adapters, printers and displays. Nonvolatile storage device 1412, includes a disk drive, nonvolatile memory, optical drive, or any other nonvolatile storage device, is shown connected to computer system 1402. In one aspect, router 1400 is used to filter incoming packets received from network 1450, such as the Internet. Packets that are accepted after being processed by router process 1414 using ACLs 1416, HTK tables 1418, rule masks 1420, and rule templates 1422 are passed to server 1460 for processing. Router 1400 may also be used to receive outgoing packets from server 1460 and transmit them to a device interconnected to the router via network 1450.

While the router described in FIG. 14 is capable of executing the invention described herein, this device is simply one example of a router. Those skilled in the art will appreciate that many other router designs are capable of performing the invention described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, a non-transitory computer readable medium such as a hard disk drive, a removable memory such as an optical disk (for eventual use in a CD ROM) or floppy disk (for eventual use in a floppy disk drive), or downloaded and stored in a memory via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method comprising:
constructing, using a processor, one or more subtables in a first memory area accessible by the processor;
reading, from a second memory area using the processor, a plurality of rules in order of increasing rule priority, wherein each of the rules includes one or more subkeys and one or more submasks;
upon reading each of the plurality of rules, using the processor to add rule information to the subtables in a manner that stores rule information distinguishing the rule being added from every rule previously added with lower rule priorities, the adding of the rule information further comprising:
identifying a range of indices in one of the subtables corresponding to one of the rule's subkeys and one of the rule's submasks;
looping through a plurality of entries of the subtables, starting at a first entry, wherein the plurality of entries is indexed by the identified range of indices and for each of the entries, determining whether a set of a plurality of key bits corresponding to the rule have been exhausted, wherein the rule's key bits are the bits included in the rule's subkey; and
in response to the rule's key bits being exhausted:
decrementing a counter corresponding to a second subtable being addressed by the first entry;
removing the second subtable in response to the decremented counter indicating that no entries address the second subtable;
receiving, at a network adapter, an incoming packet that includes a plurality of fields and forming a key from the plurality of the fields, wherein the formed key includes a plurality of subkeys; and
searching the entries stored in the subtables for one or more of the subkeys, wherein a different subtable is used to search for each of the subkeys; and wherein a next level subkey is selected and a next level subtable is searched when a pointer value is encountered in the previous level subtable.

2. The method of claim 1 further comprising:
in response to identifying the rule corresponding to one of the entries that corresponds to the searched subkeys:
retrieving a stored key and a stored mask from the entry that identified the rule;
masking the key using the stored mask, the masking resulting in a masked key;
applying the identified rule in response to the masked key matching the stored key; and
applying a default rule in response to the masked key not matching the stored key.

3. The method of claim 1 wherein, in response to the rule's key bits not being exhausted, the method further comprises:
determining whether the subtable entry's type is currently set to a failure data type; and
in response to the subtable entry's type currently being set to a failure data type:
resetting the subtable entry to address a data entry, wherein the addressed data entry corresponds to the rule being added; and
incrementing a data entry counter that corresponds to the number of subtable entries that reference the addressed data entry.

4. The method of claim 3 wherein, in response to the subtable entry's type not currently being set to a failure data type, the method further comprises:
identifying a first subtable currently being addressed by the subtable entry;
decrementing a first counter that tracks the number of entries that reference the first subtable;
determining whether a second subtable which is an alternative version of the first subtable currently exists;
in response to the second subtable not existing:
creating an uncompressed alternate subtable that corresponds to the second subtable;
adding the rule to a plurality of entries in the uncompressed alternate subtable;
generating a reference to a compressed version of the uncompressed alternate subtable; and
storing the created reference in the subtable's entry;
re-addressing the entry to the second subtable;
incrementing a second counter that tracks the number of entries that reference the second subtable; and
determining whether to remove the first subtable.

5. The method of claim 4 wherein the creation of the uncompressed alternate subtable further comprises:
in response to the subtable entry's type being a rule data type, creating the uncompressed alternate subtable of a predetermined size where each entry in the created uncompressed alternate subtable is the rule data type and wherein each entry in the created uncompressed alternate subtable references a common rule entry; and in response to the subtable entry's type being a pointer type, decompressing the subtable that is referenced by the subtable entry.

6. The method of claim 1 wherein determining whether to remove the subtable further comprises:

removing the subtable from memory in response to determining that the decremented counter is equal to zero.

7. A data processing system comprising:
one or more processors;
a memory array accessible by the processors;
a network connection that connects the data processing system to a computer network;
a set of instructions stored in the memory, wherein one or more of the processors executes the set of instructions in order to perform actions of:
constructing, using a processor, one or more subtables in a first memory area accessible by the processor;
reading, from a second memory area using the processor, a plurality of rules in order of increasing rule priority, wherein each of the rules includes one or more subkeys and one or more submasks;
upon reading each of the plurality of rules, adding rule information to the subtables in a manner that stores rule information distinguishing the rule being added from every rule previously added with lower rule priorities, the adding of the rule information further comprising:
identifying a range of indices in one of the subtables corresponding to one of the rule's subkeys and one of the rule's submasks;
looping through a plurality of entries of the subtables, starting at a first entry, wherein the plurality of entries is indexed by the identified range of indices and for each of the entries, determining whether a set of a plurality of key bits corresponding to the rule have been exhausted, wherein the rule's key bits are the bits included in the rule's subkey; and
in response to the rule's key bits being exhausted:
decrementing a counter corresponding to a second subtable being addressed by the first entry; and
removing the second subtable in response to the decremented counter indicating that no entries address the second subtable;
receiving, at a network adapter, an incoming packet that includes a plurality of fields and forming a key from the plurality of the fields, wherein the formed key includes a plurality of subkeys; and
searching the entries stored in the subtables for one or more of the subkeys, wherein a different subtable is used to search for each of the subkeys; and wherein a next level subkey is selected and a next level subtable is searched when a pointer value is encountered in the previous level subtable.

8. The data processing system of claim 7 wherein the actions further comprise:
in response to identifying the rule corresponding to one of the entries that corresponds to the searched subkeys:
retrieving a stored key and a stored mask from the entry that identified the rule;
masking the key using the stored mask, the masking resulting in a masked key;
applying the identified rule in response to the masked key matching the stored key; and
applying a default rule in response to the masked key not matching the stored key.

9. The data processing system of claim 7 wherein, in response to the rule's key bits not being exhausted, the data processing system further comprises instructions that perform the actions of:
determining whether the subtable entry's type is currently set to a failure data type; and
in response to the subtable entry's type currently being set to a failure data type:
resetting the subtable entry to address a data entry, wherein the addressed data entry corresponds to the rule being added; and
incrementing a data entry counter that corresponds to the number of subtable entries that reference the addressed data entry.

10. The data processing system of claim 9 wherein, in response to the subtable entry's type not currently being set to a failure data type, the data processing system further comprises instructions that perform the actions of:
identifying a first subtable currently being addressed by the subtable entry;
decrementing a first counter that tracks the number of entries that reference the first subtable;
determining whether a second subtable which is an alternative version of the first subtable currently exists;
in response to the second subtable not existing:
creating an uncompressed alternate subtable that corresponds to the second subtable;
adding the rule to a plurality of entries in the uncompressed alternate subtable;
generating a reference to a compressed version of the uncompressed alternate subtable; and
storing the created reference in the subtable's entry;
re-addressing the entry to the second subtable;
incrementing a second counter that tracks the number of entries that reference the second subtable; and
determining whether to remove the first subtable.

11. The data processing system of claim 10 wherein the creation of the uncompressed alternate subtable further comprises instructions that perform the actions of:
in response to the subtable entry's type being a rule data type, creating the uncompressed alternate subtable of a predetermined size where each entry in the created uncompressed alternate subtable is the rule data type and wherein each entry in the created uncompressed alternate subtable references a common rule entry; and
in response to the subtable entry's type being a pointer type, decompressing the subtable that is referenced by the subtable entry.

12. The data processing system of claim 8 further comprising:
a table lookup unit (TLU) accessible by at least one of the processors, wherein the instructions executed by one of the processors to perform the searching further performs the actions of:
sending the key to the table lookup unit, wherein the searching is performed by the TLU.

13. A computer program product stored in a non-transitory computer readable medium, comprising functional descriptive material that, when executed by a data processing system, causes the data processing system to perform actions that include:
constructing, using a processor, one or more subtables in a first memory area accessible by the processor;

reading a plurality of rules in order of increasing rule priority, wherein each of the rules includes one or more subkeys and one or more submasks;

upon reading each of the plurality of rules, using the processor to add rule information to the subtables in a manner that stores rule information distinguishing the rule being added from every rule previously added with lower rule priorities, the adding of the rule information further comprising:

identifying a range of indices in one of the subtables corresponding to one of the rule's subkeys and one of the rule's submasks;

looping through a plurality of entries of the subtables, starting at a first entry, wherein the plurality of entries is indexed by the identified range of indices and for each of the entries, determining whether a set of a plurality of key bits corresponding to the rule have been exhausted, wherein the rule's key bits are the bits included in the rule's subkey; and in response to the rule's key bits being exhausted:
decrementing a counter corresponding to a second subtable being addressed by the first entry; and
removing the second subtable in response to the decremented counter indicating that no entries address the second subtable;

receiving, at a network adapter, an incoming packet that includes a plurality of fields and forming a key from the plurality of the fields, wherein the formed key includes a plurality of subkeys; and searching the entries stored in the subtables for one or more of the subkeys, wherein a different subtable is used to search for each of the subkeys; and wherein a next level subkey is selected and a next level subtable is searched when a pointer value is encountered in the previous level subtable.

14. The computer program product of claim 13 further comprising instructions that perform the actions of:

in response to identifying the rule corresponding to one of the entries that corresponds to the searched subkeys:
retrieving a stored key and a stored mask from the entry that identified the rule;
masking the key using the stored mask, the masking resulting in a masked key;
applying the identified rule in response to the masked key matching the stored key; and
applying a default rule in response to the masked key not matching the stored key.

15. The computer program product of claim 13 wherein, in response to the rule's key bits not being exhausted, the computer program product further comprises instructions that perform the actions of:

determining whether the subtable entry's type is currently set to a failure data type; and in response to the subtable entry's type currently being set to a failure data type:
resetting the subtable entry to address a data entry, wherein the addressed data entry corresponds to the rule being added; and
incrementing a data entry counter that corresponds to the number of subtable entries that reference the addressed data entry.

16. The computer program product of claim 15 wherein, in response to the subtable entry's type not currently being set to a failure data type, the computer program product further comprises instructions that perform the actions of:

identifying a first subtable currently being addressed by the subtable entry;

decrementing a first counter that tracks the number of entries that reference the first subtable;

determining whether a second subtable which is an alternative version of the first subtable currently exists;

in response to the second subtable not existing:
creating an uncompressed alternate subtable that corresponds to the second subtable;
adding the rule to a plurality of entries in the uncompressed alternate subtable;
generating a reference to a compressed version of the uncompressed alternate subtable; and
storing the created reference in the subtable's entry;
re-addressing the entry to the second subtable;
incrementing a second counter that tracks the number of entries that reference the second subtable; and
determining whether to remove the first subtable.

17. The computer program product of claim 16 wherein the creation of the uncompressed alternate subtable further comprises instructions that perform the actions of:

in response to the subtable entry's type being a rule data type, creating the uncompressed alternate subtable of a predetermined size where each entry in the created uncompressed alternate subtable is the rule data type and wherein each entry in the created uncompressed alternate subtable references a common rule entry; and in response to the subtable entry's type being a pointer type, decompressing the subtable that is referenced by the subtable entry.

* * * * *